US011491692B2

(12) United States Patent
Carr et al.

(10) Patent No.: US 11,491,692 B2
(45) Date of Patent: Nov. 8, 2022

(54) INJECTION MOLDING APPARATUS

(71) Applicant: Plastikos, Inc., Erie, PA (US)

(72) Inventors: Stephen R. Carr, Erie, PA (US); Christopher W. Hanes, Erie, PA (US)

(73) Assignee: Plastikos, Inc., Erie, PA (US)

( * ) Notice: Subject to any disclaimer, the term of this patent is extended or adjusted under 35 U.S.C. 154(b) by 270 days.

(21) Appl. No.: 16/878,277

(22) Filed: May 19, 2020

(65) Prior Publication Data

US 2021/0362387 A1 Nov. 25, 2021

(51) Int. Cl.
*B29C 45/73* (2006.01)

(52) U.S. Cl.
CPC ................................ *B29C 45/7312* (2013.01)

(58) Field of Classification Search
CPC ............ B29C 45/7312; B29C 45/2675; B29C 45/2737; B29C 33/04
See application file for complete search history.

(56) References Cited

U.S. PATENT DOCUMENTS

| 4,678,158 A | 7/1987 | Brock |
| 4,689,005 A | 8/1987 | Plummer |
| 6,328,552 B1* | 12/2001 | Hendrickson ....... B29C 45/2675 425/188 |
| 6,540,499 B2* | 4/2003 | Schneider ........... B29C 45/2675 425/190 |
| 7,029,260 B2 | 4/2006 | Godwin et al. |
| 7,338,626 B1 | 3/2008 | Groth |
| 7,399,179 B2 | 7/2008 | Schultz et al. |
| 7,972,129 B2 | 7/2011 | O'Donoghue |
| 7,997,895 B1 | 8/2011 | Schmidt |
| 8,282,386 B2 | 10/2012 | Babin et al. |
| 8,308,467 B2 | 11/2012 | Jung et al. |
| 9,302,416 B1 | 4/2016 | Hepler |
| 2003/0150586 A1* | 8/2003 | Matsuura ............ B29C 45/1756 164/137 |
| 2014/0175690 A1* | 6/2014 | Sudermann ......... B29C 45/1756 425/182 |

* cited by examiner

*Primary Examiner* — Kelly M Gambetta
*Assistant Examiner* — Virak Nguon
(74) *Attorney, Agent, or Firm* — Benesch, Friedlander, Coplan & Aronoff LLP

(57) ABSTRACT

An injection molding apparatus is provided for use with a mold unit having a water line. The apparatus includes a mold base plate. The plate has a compartment configured to contain the mold unit, and further has a water line passage with an open inner end at the compartment. A first section of the water line passage includes the open inner end. A second section of the water line passage reaches away from the first section. The plate has a slot along which the first section of the water line passage is open for insertion of the water line transversely into the first section. The plate covers the second section of the water line passage such that the second section is closed to insertion of the water line transversely into the second section.

20 Claims, 4 Drawing Sheets

INJECTION MOLDING APPARATUS

TECHNICAL FIELD

This technology includes mold base assemblies for supporting mold core blocks and mold cavity blocks in injection molding machines.

BACKGROUND

An injection molding apparatus includes mold base assemblies for mounting in a molding machine. The base assemblies may include a first base assembly for mounting on a stationary platen in the molding machine, and a second base assembly for mounting on a movable platen in the molding machine. In operation, the machine carries the movable platen toward and away from the stationary platen to carry the second base assembly into and out of abutment with first base assembly. In that position, opposed mold units on the base assemblies together define closed mold cavities in which molded plastic parts can be formed. The mold units may have water lines that need to be fitted within the base assemblies.

SUMMARY

An injection molding apparatus is provided for use with a mold unit having a water line. The apparatus includes a mold base plate. The plate has a compartment configured to contain the mold unit, and has a water line passage with an open inner end at the compartment. A first section of the water line passage includes the open inner end. A second section of the water line passage reaches away from the first section. The plate has a slot along which the first section of the water line passage is open for insertion of the water line transversely into the first section. The plate covers the second section of the water line passage such that the second section is closed to insertion of the water line transversely into the second section.

DESCRIPTION

Figure 1:
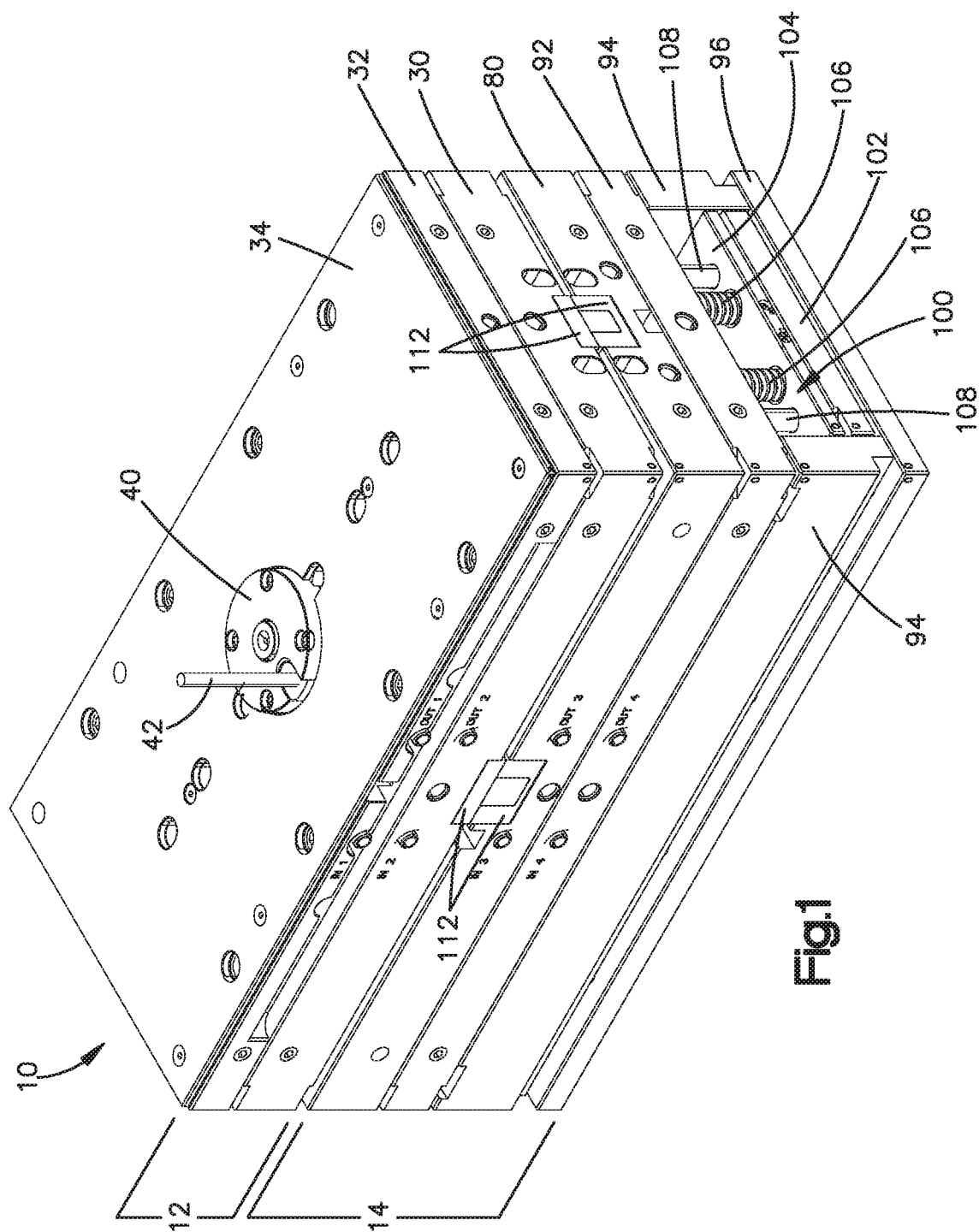
FIG. 1 is a perspective view of an injection molding apparatus including a pair of mold base assemblies.

The structures illustrated in the drawings include parts that are examples of the elements recited in the claims. The illustrated structures thus include examples of how a person of ordinary skill in the art can make and use the apparatus defined by the claims. They are described here to provide enablement and best mode under the patent statute without imposing limitations that are not recited in the claims. One or more of the elements of one embodiment may be used in combination with, or as a substitute for, one or more elements of another as needed for any particular implementation of the claimed apparatus.

As shown in FIG. 1, an injection molding apparatus 10 includes a pair of mold base assemblies 12 and 14. The base assemblies 12 and 14 are configured for mounting in a molding machine. In the illustrated example, the first base assembly 12 is configured for mounting on a stationary platen in the molding machine. The second base 14 assembly is configured for mounting on a movable platen in the mold machine. In operation, the molding machine carries the movable platen toward and away from the stationary platen to carry the second base assembly 14 into and out of abutment with first base assembly 12. In that position, opposed mold units on the base assemblies 12 and 14 together define closed mold cavities in which molded plastic parts can be formed.

The first base assembly 12 includes an A plate 30 facing toward the second base assembly 14. The first base assembly 12 further includes a top clamp plate 32, which supports the A plate 30 on the stationary platen in the molding machine. An insulator sheet 34 overlies the top clamp plate 32. Other parts of the first base assembly 12 include a locating ring 40 and electrical leads 42 for a hot sprue. As shown at the opposite side in FIG. 2, guide pins 46 project from the A plate 30 to guide reciprocating movement of the second base assembly 14 relative to the first base assembly 12.

Figure 2:
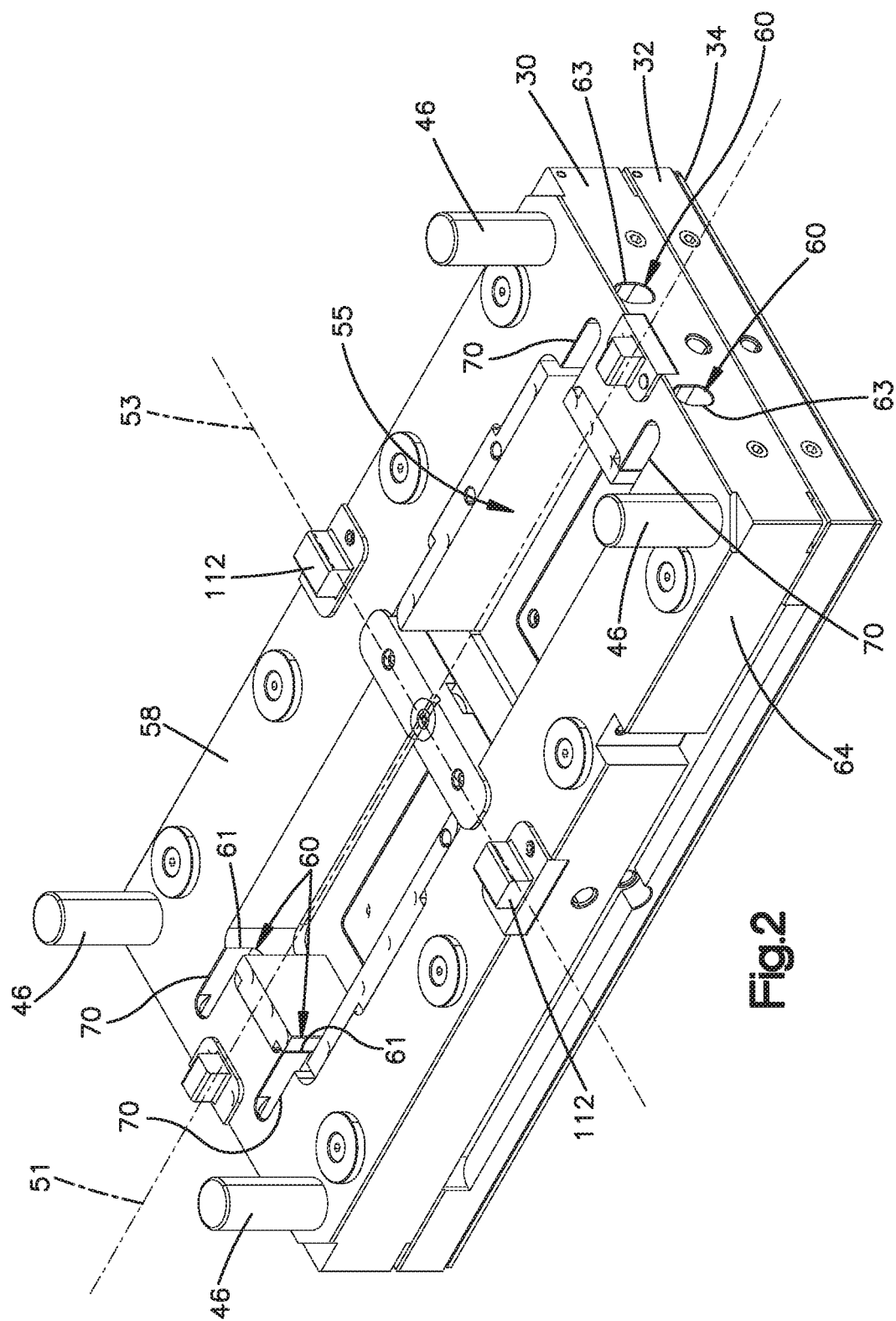
FIG. 2 is a perspective view of a first one of the two mold base assemblies of FIG. 1, showing the first mold base assembly a position inverted from that of FIG. 1.

As further shown in FIG. 2, the first base assembly 12 is rectangular with a longitudinal centerline 51 and a transverse centerline 53. The A plate 30 has a pair of mold unit compartments 55. The mold unit compartments 55 are rectangular, are centered on the longitudinal centerline 51, and are arranged symmetrically on opposite side of the transverse centerline 53. Each mold unit compartment 55 is configured to receive a respective mold unit in the form of a mold cavity block. The A plate 30 also has a planar side surface 58 at which the mold unit compartments 55 are open for insertion of the cavity blocks.

Water line passages 60 are provided in the A plate 30. Each water line passage is configured to receive one or more water lines projecting from a mold unit in a compartment 55. In the illustrated example, the A plate 30 has a pair of water line passages 60 at the outer end of each compartment 55. The water line passages 60 in each pair are arranged symmetrically on opposite sides of the longitudinal centerline 51. Each water line passage 60 has an open inner end 61 at the respective compartment 55, and has an open outer end 63 at an adjacent peripheral edge surface 64 of the A plate 30. In the illustrated example, each water line passage 60 has a linear configuration parallel to the longitudinal centerline 51 fully from the open inner end 61 to the open outer end 63.

Figure 3:
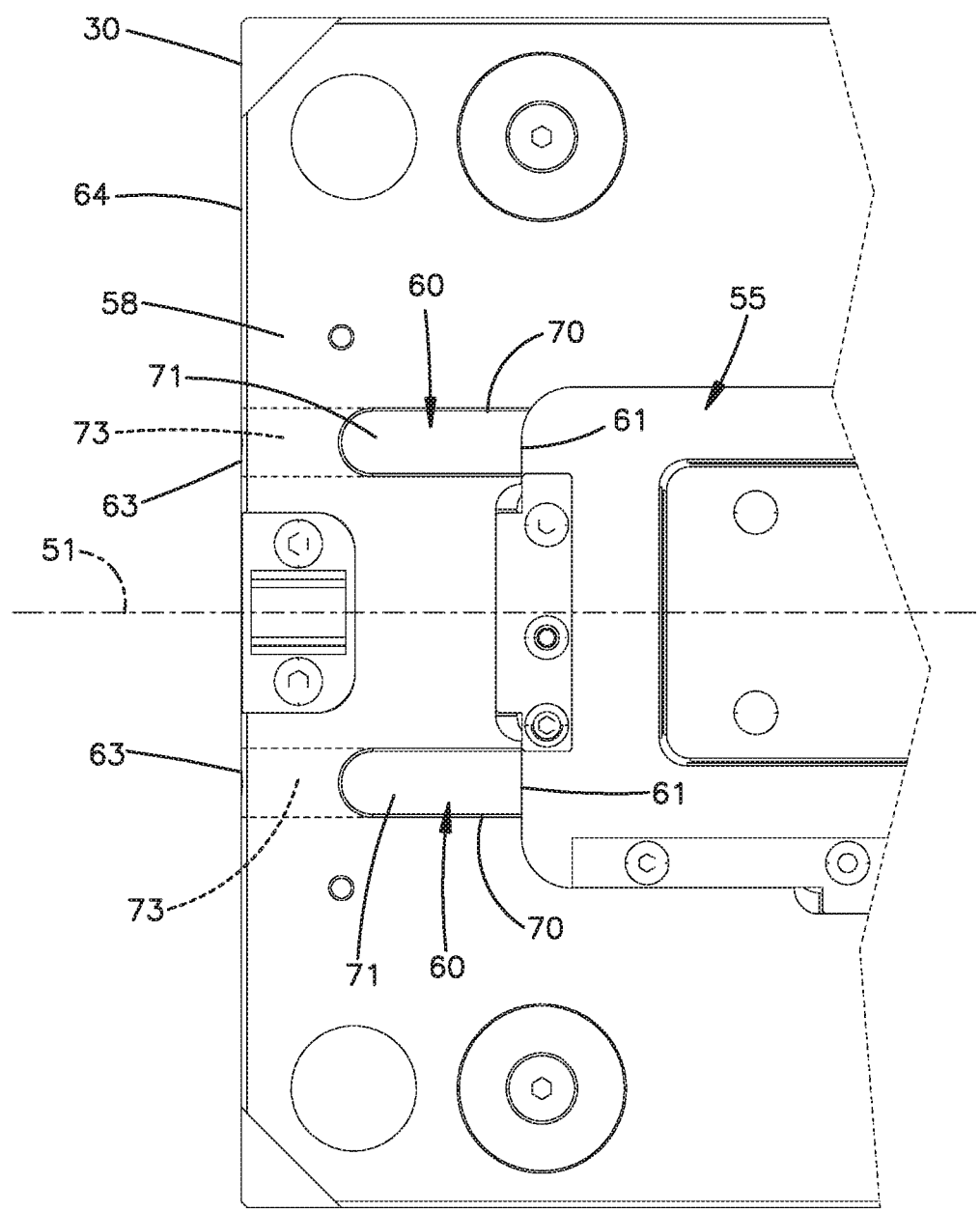
FIG. 3 is a partial elevational view of the first one of the two mold base assemblies of FIG. 1.

As best shown in FIG. 3, the side surface 58 of the A plate 30 has slots 70 at the water line passages 60. Each slot 70 extends along a respective water line passage 60 from the open inner end 61 at the respective mold unit compartment 55 toward the open outer end 63 at the peripheral edge surface 64. The slot 70 thus defines a first section 71 of the water line passage 60 that is open at the side surface 58. However, the side surface 58 is continuous across a second section 73 of the waterline passage 60 that reaches from the first section 71 to the open outer end 63. In this configuration, the water line passage 60 is open for insertion of a water line into the first section 71 transversely inward through the slot 70. In this context, insertion of a water line "transversely" inward means that a length portion of the water line is moved through the slot 70 at once in a direction transverse to the length of the slot 70, rather than being inserted gradually in a longitudinal direction lengthwise of the slot 70. This can be done simultaneously with insertion of the mold unit into mold unit compartment 55 in the same direction. In contrast, the passage 60 is closed to insertion of a water line into the second section 73 transversely through the slot 70. A water line can thus be inserted into the second section 73 by advancing the water line longitudinally from the first section 71 into the second section 73.

The configuration of the A plate 30 provides structural reinforcement where the side surface 58 reaches across the second section 73 of the water line passage 60. Although the first section 71 is preferably longer than the second section 73, the structural reinforcement at the second section 73 is helpful to resist deformation under the elevated pressure at which the base assemblies 12 and 14 are pressed together in the closed position.

Figure 4:
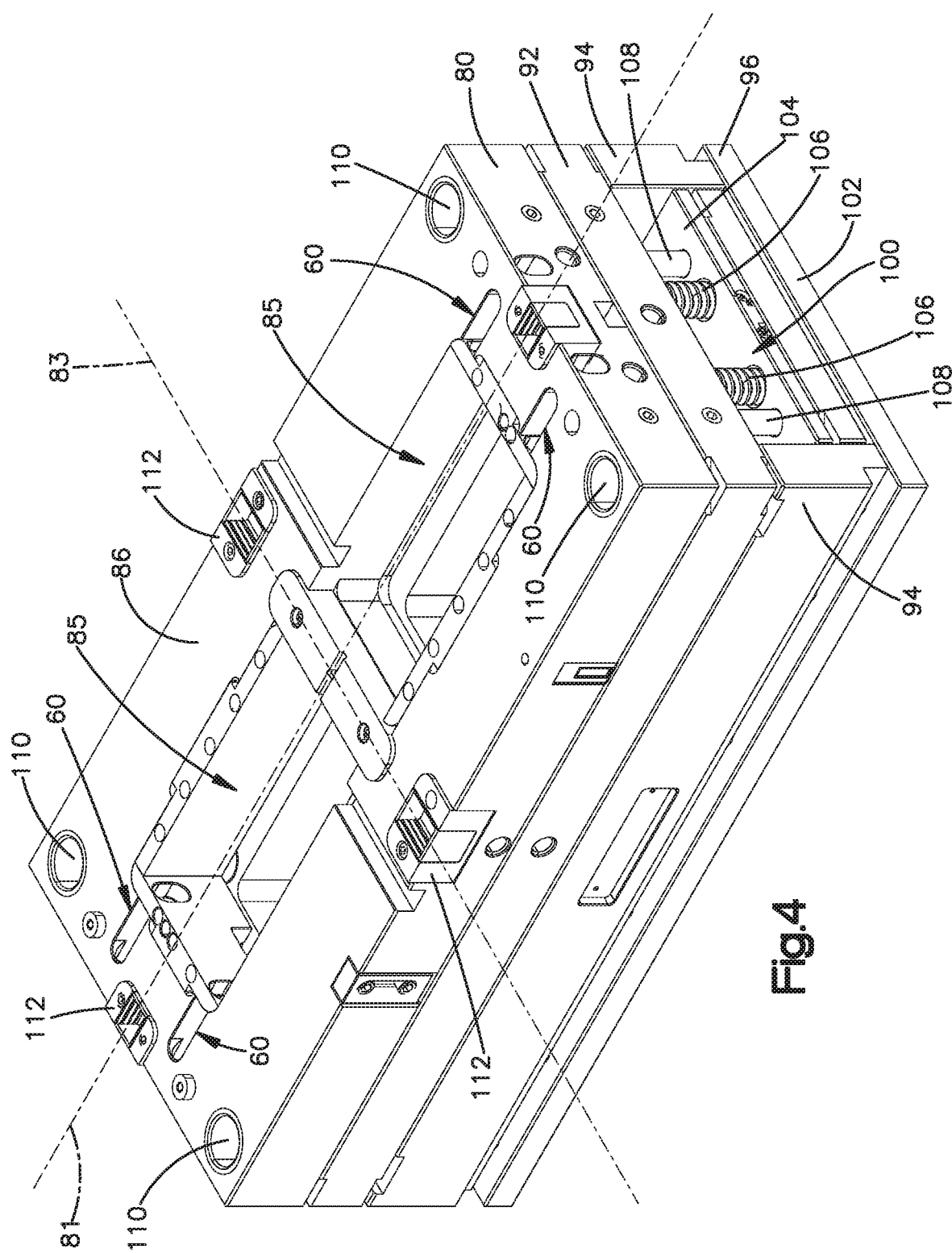
FIG. 4 is a perspective view of the second one of the two mold base assemblies of FIG. 1.

The second base assembly 14 has a B plate 80 facing toward the opposed A plate 30 in the first base assembly 12, as shown in FIG. 4. The B plate 80 has longitudinal and transverse centerlines 81 and 83. The B plate 80 also has a pair of mold unit compartments 85, each of which is open at a surrounding planar surface 86 of the B plate 80. These mold unit compartments 85 are arranged relative to the centerlines 81 and 83 of the B plate 80 in the same manner that the mold unit compartments 55 are arranged relative to the centerlines 51 and 53 of the A plate 30. However, each mold unit compartment 85 in the B plate 80 is configured to receive a respective mold unit in the form of a mold core block rather than a mold cavity block.

The B plate 80 is fixed to a support plate 92. Rails 94 attach the support plate 92 to a bottom clamp plate 96, which is configured for attachment to the movable platen in the molding machine. An ejector plate assembly 100 is operative between the support plate 92 and the bottom clamp plate 96. The ejector plate assembly 100 includes an ejector base plate 102, an ejector retainer plate 104, springs 106, and guide pins 108, as known in the art. Bores 110 in the B plate 80 receive the guide pins 46 projecting from the A plate 30, and parting line locks 112 are provided between the A and B plates 30 and 80, also as known in the art.

As described above regarding the A plate 30, the B plate 80 is likewise provided with water line channels 60. The water line channels 60 in the B plate 80 have the same structure and function as the water line channels 60 in the A plate 30.

This written description sets forth the best mode of carrying out the invention, and describes the invention so as to enable a person of ordinary skill in the art to make and use the invention, by presenting examples of the elements recited in the claims. The detailed descriptions of those examples do not impose limitations that are not recited in the claims.

What is claimed is:

1. An injection molding apparatus for use with a mold unit having a water line, the apparatus comprising:
   a mold base plate having a compartment configured to contain the mold unit, and further having a water line passage, wherein the water line passage has an open inner end at the compartment, a first section including the open inner end, and a second section reaching away from the first section;
   wherein the plate has a slot along which the first section of the water line passage is open for insertion of the water line transversely into the first section, and the plate covers the second section of the water line passage such that the second section is closed to insertion of the water line transversely into the second section.

2. An apparatus as defined in claim 1, wherein the plate has a side surface at which the compartment is open for insertion of the mold unit, and the slot is located at the side surface.

3. An apparatus as defined in claim 1, wherein the plate has a peripheral edge surface, the water line passage has an open outer end at the peripheral edge surface, and the second section of the water line passage reaches from the first section to the open outer end.

4. An apparatus as defined in claim 3, wherein the water line passage has a linear configuration fully from the open inner end to the open outer end.

5. An apparatus as defined in claim 1, wherein the compartment has a centerline, and the water line passage is one of a pair of water line passages that are alike and arranged symmetrically on opposite sides of the centerline.

6. An apparatus as defined in claim 5, wherein the compartment is elongated and the centerline is a longitudinal centerline.

7. An apparatus as defined in claim 6, wherein the plate is elongated with a transverse centerline, the compartment is one of a pair of compartments arranged symmetrically on opposite sides of the transverse centerline, and the water line passage is one of four water line passages that are alike and arranged symmetrically at opposite ends of the pair of compartments.

8. An apparatus as defined in claim 1, wherein the mold base plate is part of a mold base assembly configured for attachment to a stationary platen in a molding machine.

9. An apparatus as defined in claim 1, wherein the mold base plate is part of a mold base assembly configured for attachment to a movable platen in a mold machine.

10. An injection molding apparatus for use with a core block having a water line, and a cavity block having a water line, the apparatus comprising:
    a first mold base plate having a core block compartment configured to receive the core block, a side surface at which the core block compartment is open for insertion of the core block, and a water line passage with an open inner end at the core block compartment; and
    a second mold base plate having a cavity block compartment configured to receive the cavity block, a side surface at which the cavity block compartment is open for insertion for the cavity block, and a water line passage with an open inner end at the cavity block compartment;
    wherein each of the side surfaces has a slot along which a first section of a respective water line passage is open for insertion of a water line transversely into the first section, and each of the side surfaces is continuous along a second section of the respective water line passage such that the second section is closed to insertion of a water line transversely into the second section.

11. An apparatus as defined in claim 10, wherein the first section of each of the water line passages is longer than a respective second section.

12. An apparatus as defined in claim 10, wherein each of the plates has a peripheral edge surface, each of the water line passages has an open outer end at a respective peripheral edge surface, and the second section of each of the water line passages reaches from a respective first section to a respective open outer end.

13. An apparatus as defined in claim 12 wherein each of the water line passages has a linear configuration fully from a respective open inner end to a respective open outer end.

14. An apparatus as defined in claim 10, wherein each of the compartments has a centerline, and each of the water line passages is one of a pair of water line passages that are alike and arranged symmetrically on opposite sides of a respective centerline.

15. An apparatus as defined in claim 14, wherein each of the compartments is elongated and each of the centerlines is a longitudinal centerline.

16. An apparatus as defined in claim 15, wherein each of the plates is elongated with a transverse centerline, each of the compartments is one of a pair of compartments arranged symmetrically on opposite sides of a respective transverse centerline, and each of the water line passages is one of four water line passages that are alike and arranged symmetrically at opposite ends of a pair of compartments.

17. An injection molding apparatus for use with a mold unit that has a water line and is configured as a core block or a cavity block, the apparatus comprising:
    a mold base plate having a compartment configured to contain the mold unit, a side surface at which the compartment is open to receive the mold unit, and a water line passage with an open inner end at the compartment;
        wherein the water line passage has a first section including the open inner end, and has a second section reaching away from the first section; and
        the side surface has a slot along which the first section of the water line passage is open for insertion of the water line transversely into the first section, and the side surface is continuous along the second section of the water line passage such that the second section is closed to insertion of the water line transversely into the second section.

18. An apparatus as defined in claim 17, wherein the first section of the water line passage is longer than the second section.

19. An apparatus as defined in claim 17, wherein the mold base plate has a peripheral edge surface, the water line passage has an open outer end at the peripheral edge surface, and the second section of the water line passage reaches from the first section to the open outer end.

20. An apparatus as defined in claim 19, wherein the water line passage has a linear configuration fully from the open inner end to the open outer end.

\* \* \* \* \*